(12) United States Patent
Buell et al.

(10) Patent No.: US 6,303,928 B1
(45) Date of Patent: Oct. 16, 2001

(54) CONTINUOUS COLD ATOM BEAM ATOMIC SYSTEM

(75) Inventors: Walter F. Buell, Rancho Palos Verdes; Bernardo Jaduszliwer, Santa Monica, both of CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/217,722

(22) Filed: Dec. 21, 1998

(51) Int. Cl.$^7$ ........................................... H05H 3/02
(52) U.S. Cl. .................................. 250/251; 331/3
(58) Field of Search ................. 250/251; 331/3

(56) References Cited

U.S. PATENT DOCUMENTS

| | | | |
|---|---|---|---|
| 4,331,933 | * 5/1982 | Allan et al. | 331/3 |
| 4,684,900 | * 8/1987 | Avila et al. | 331/3 |
| 4,740,761 | * 4/1988 | Barnes et al. | 331/3 |
| 4,943,955 | * 7/1990 | Rabian et al. | 368/156 |
| 5,338,930 | * 8/1994 | Chu et al. | 250/251 |
| 5,528,028 | * 6/1996 | Chu et al. | 250/251 |

OTHER PUBLICATIONS

"Single Beam Atom Trap in a Pyramidal and Conical Hollow Mirror", Lee, K.I.; Kim, J.A.; Noh, H.R.; Jhe, W., Optics Letters, vol. 21, No. 15, pp. 1177–1179, Aug. 1, 1996.
"Low Velocity Intense Source of Atoms from a Magneto–Optical Trap", Lu, Z.T.; Corwin, K.L.; Renn, M.J.; Anderson, M.H.; Cornell, E.A.; Wieman, C.E.; The American Physical Society, vol. 77, No. 16, Oct. 14, 1996.

* cited by examiner

*Primary Examiner*—Bruce Anderson
(74) *Attorney, Agent, or Firm*—Derrick Michael Reid

(57) ABSTRACT

An improved magneto-optic trap is used to generate a high brightness low velocity continuous source of atoms as a continuous atomic beam. The improved magneto-optic atom trap is using gradient magnetic fields and a single circularly polarized laser beam incident upon a right angle conical mirror with apex aperture through which the continuous cold atom beam and central portion of the incident laser trapping light exit along a dark column. For use in an atomic clock system, a collimating and deflecting pumping laser provides transverse cooling of the atoms beam to bend and separate the cold atom beam from trapping laser light for reducing light shifts of the atomic clock operating frequency. The atomic clock can be a microwave cavity or Raman-type atomic clock.

10 Claims, 3 Drawing Sheets

COLD ATOM ATOMIC CLOCK

COLD ATOM ATOMIC CLOCK

CONTINUOUS COLD ATOM BEAM
MICROWAVE CAVITY ATOMIC SYSTEM

CONTINUOUS COLD ATOM
BEAM RAMAN ATOMIC SYSTEM

CONTINUOUS COLD ATOM BEAM ATOMIC SYSTEM

STATEMENT OF GOVERNMENT INTEREST

The invention was made with Government support under contract No. F04701-93-C-0094 by the Department of the Air Force The Government has certain rights in the invention.

FIELD OF THE INVENTION

The invention relates to the field of atomic clocks and atomic cooling and pumping methods. More particularly, the present invention relates to magneto-optic trapping and the generation of continuous cold atomic beams and their use in atomic clock systems.

BACKGROUND OF THE INVENTION

Highly stable atomic frequency standards are of increasing importance for a variety of applications, ranging from communication to navigation and time-transfer to tests of fundamental science. Atomic clocks are today critical components in a variety of space systems, including the Global Positioning System, communication satellites, and scientific experiments for the International Space Station. It is desirable to have improved clock stability, as well as reduced size, weight sand power usage with increased lifetime and reliability. Atomic clocks are, as a matter of principle, less susceptible to radiation effects than, for example, quartz-crystal oscillators, and are well suited for many space applications. As the need for ever more accurate and stable atomic clocks continues to grow, large laboratory primary standards are moving in the direction of laser-pumped atomic fountain clocks. At the same time, however, the need for high performance secondary standards suitable for space applications grows as well, with the added requirements of reduced size, weight and power consumption and increased reliability. These efforts require a thorough understanding of the underlying physical processes operating in the clocks, and include the use of new techniques such as laser optical pumping and laser cooling and trapping.

Atomic clocks have long employed Ramsey's method of separated oscillatory fields. The atomic system can be based on different quantum transitions, and on different types of atoms, such as, cesium (Cs) and cesium based atomic clock systems are well known. The locking of a microwave source to the cesium (Cs) transition has been achieved to provide a stable practical ticking atomic clock signal. A type of atomic clock provides a clock signal based on an atomic system where hyperfine quantum transitions are used as an internal reference for providing a Ramsey output. The Ramsey output is fed into a phase detector providing an error signal to a voltage controlled oscillator providing the clock signal that is fed into a frequency synthesizer then providing microwave excitation to the atomic system in a closed loop. A phase modulator provides a reference signal to the phase detector and provides a modulation signal to the frequency synthesizer for closed loop control.

Certain atomic clock systems have used pulsed cold atom beams that propagate through a vacuum chamber, are illuminated by laser beams and detected by state-selective laser induced fluorescence detected by photodetectors for generating the Ramsey output signal. The frequency stability of atomic clocks is usually characterized by the well-known Allan deviation equation which uses a series of fractional frequency deviation measurements. A high signal to noise ratio and a narrow clock signal are required for superior stability and clock performance. Such Ramsey atomic systems may be based upon a microwave cavity excitation or Raman processes. Raman transitions have been investigated for application to Ramsey-type atomic frequency standards. For semiconductor laser excitation of the Raman transition in a Cs thermal atomic beam, results indicate a projected short term Allan deviation of $[6 \times 10E-11]/[\sqrt{T}]$. Because of the limited interaction time for their thermal atomic beam, the Ramsey fringe width was about one kHz.

In certain cesium beam atomic clocks, the clock signal may be based on Ramsey's separated oscillatory field method and the clock stability is related to the width of the central Ramsey. When other broadening mechanisms are negligible, this fringe width is limited by the interaction time, that is the time of flight of cesium atoms through the apparatus. By employing laser cooling techniques to produce a slow, cold atomic beam, the width, that is the frequency variation, of the clock signal can be reduced, improving clock performance or, alternatively, achieve comparable performance in a more compact design. Atomic beam slowing techniques based on spontaneous emission optical forces generally suffer from transverse velocity diffusion that limits the atomic beam brightness and hence the clock signal to noise ratio. In addition, the slowing distance is often larger than the rest of the apparatus combined. There are a number of alternatives to spontaneous force atomic beam slowing, for example longitudinal atomic beam slowing with stimulated forces from a bichromatic laser field.

Improving signal to noise in a beam-type atomic clock requires not simply a large number of atoms, but a large number of atoms in the $|M=0>$ magnetic sublevel of one of the two ground hyperfine levels. The Ramsey method in conventional Cs beam atomic clocks employs Stern-Gerlach magnets to perform the state selection and measurement, and a U-shaped microwave cavity for the separated oscillatory fields. This conventional Cs beam approach makes use of only a fraction of the initial total atomic flux because of the ground state degeneracy. In addition, the Stern-Gerlach magnets have a narrow velocity passband, and the net result is that only a couple percent of the total atomic flux contributes to the clock signal. In recent years, however, there has been significant interest in optically pumped Cs beam standards in which laser optical pumping replaces the Stern-Gerlach magnets. Such optically pumped standards are based on hyperfine and magnetic optical pumping techniques that can significantly increase the population in the $|M=0>$ state, with a corresponding improvement in signal to noise ratio. An improved signal to noise ratio is achieved with laser optical pumping and state selective fluorescence detection replacing the Stern-Gerlach magnets.

The single laser beam magneto-optic trap (MOT) is one means to provide a cold atom beam. The MOT may be formed with a single circularly polarized laser beam from a 150 mW DBR diode laser SDL-5722 directed into a right-angle conical reflector. Polarization changes upon reflection and the linear gradient magnetic field, flipping the sign at the origin, provide the three-dimensional counter-propagating light fields of the appropriate polarizations required for the MOT. The conical reflector may be a 2.5 cm radius OFHC-copper cylinder with a diamond-machined conical inner surface and a protected gold reflective coating of rms surface roughness less than 5 nm. The gold reflective coating is protected by a transparent dielectric protective overcoat. The MOT is effective for trapping atoms at the center of the MOT and the cold atoms are forced out of the MOT along a column by the central portion of the incident laser beam, forming a low-velocity intense source (LVIS) of cold atoms in a beam. One disadvantage of conventional optical molasses or MOT-based sources, such as atomic fountains or the PHARAO space clock, is that they result in a discontinuous atomic beam at discrete pulses, and involve a plurality of orthogonal trapping laser beams. The discrete pulses disadvantageously require the use of time-segmented processing elements and local oscillators. In a conventional MOT, without a leaking dark column, the number of trapped atoms is roughly independent of the temperature, because the loading rate and collisional loss rate depend on temperature in a similar way. In the LVIS, because the loss is dominated by the transfer of atoms from the MOT to the atomic beam, increasing the operating temperature, up to a point, will increase atomic flux significantly. To further increase the atomic beam intensity, a transverse laser cooling region immediately follows the output of the apex of the cone. With a Ramsey interaction length of 15 cm, and shot noise-limited fluorescence detection of the atomic flux, assuming that we have employed laser optical pumping to the |F=3,M=0> state, a short-term Allan deviation of $[3X\times 10E-14]/[\sqrt{T}]$ may be achievable.

Short term and long term clock stability are of considerable importance. Long term clock stability is limited by random walk processes, typically driven by temperature variations, laser or microwave power drifts, and similar effects. With the introduction of diode lasers and atom cooling and trapping techniques, new elements are introduced that will influence long term stability of the atomic beam from a MOT. It is thus important to consider the suitability of these advanced clock concepts to space applications, including issues of operation in the space environment as well as size, weight, power requirements, and clock lifetime and reliability. Space environment related issues include the microgravity environment that poses obvious problems for an atomic fountain clock and the space radiation environment, both natural and man-made. An operating MOT has been used in the microgravity environment of parabolic trajectory airplane flights, and the PHARAO project in the development of a microgravity cold atom clock. Presently there is a development of a space-flyable MOT for evaluation on a future Space-Shuttle flight.

The use of a pulsed cold atom beam necessitates the use of intermittent laser excitation. It is desirable that the cold atom beam be continuous for continuity of the closed loop control signal. Additionally, existing atomic clocks based on laser cooling and trapping techniques suffer from large size and considerable technical complexity. These and other disadvantages are solved or reduced using the invention.

SUMMARY OF THE INVENTION

An object of the invention is to provide a continuous cold atomic beam using magneto-optical trapping.

Another object of the invention is to provide an atomic clock using a continuous cold atom beam.

Another object of the invention is to provide a deflected continuous cold atom beam.

Yet another object of the invention is to provide an improved stability atomic clock with improved timing stability using a continuous cold atom beam.

The invention is directed towards a continuous cold atom beam source based on magneto-optical trapping for slowing the atoms within the atom beam to achieve a high flux, slow, cold atomic beam in a simple and highly compact design. The cold atom source is based on a modification of innovations in magneto-optical trapping of atoms. The continuous cold atom clock is based on a continuous cold atomic beam extracted from magneto-optically trapped atoms. A single laser beam MOT has an apex aperture in the reflector for providing a continuous slow atomic beam for incorporation in an atomic clock and a bent-beam configuration with optical deflection reducing light shifts in the interaction region. The atomic clock is based on a cold sample source, and is still a single pass Ramsey beam-type clock suitable for microgravity but with a longer interaction time for improved stability. The improvement provides a good compromise for space-based clocks, and the continuous nature of the cold beam is an advantage as well because a local oscillator is not required as would be the case for clocks based on pulsed cold atom beams. The invention provides a compact atomic clock design without the use of a beam oven, and provides for the potential elimination of many of the microwave components, and the laser-pumped cold atom clock described here appears promising for the size, weight and power requirements so important for space deployment. The Raman atomic clock is based on two-photon, Raman processes characterized as a Λ based system, rather than based on a resonant microwave cavity. This resonant microwave cavity gives rise to a number of systematic errors in atomic clocks, such as distributed phase shifts and cavity pulling in Cs beam standards.

The atomic clock exploits the techniques of laser cooling and trapping of atoms and the use of laser pumping. A continuos beam of cold atoms is extracted from a single beam magneto-optic trap. Atomic clocks can be based on Raman transitions instead of conventional microwave excitation for laser cooled atomic beam clocks. The invention provides an improved atomic frequency standard for precise timekeeping applications. The improvement in stability derives from the low velocity of atoms from the source and high atomic flux achieved by using laser cooling and trapping techniques.

The invention provides improved timekeeping stability in a compact low power consumption device suitable for space applications. The advantages over existing cold atom clocks, such at those based on atomic fountains or launched cold clouds of atoms are the continuous nature of the atomic beam and the high intensity of the atomic beam. In addition the single laser beam/conical reflector design of the cold atom source represents a significant simplification of the design. The advantages over cold atom clocks based on laser slowing of a thermal atomic beam is the highly compact and simple nature of the source. The continuous cold atom beam is generated using a modified trapping cone having an aperture at the cone apex for ejecting the cold atom beam which is then bent by a excitation laser for separating the cold atom beam for a coincident laser beam for improved quantum interaction within the vacuum chamber of the atomic clock. Another advantage over laser pumped and laser cooled atomic clock designs is the bent beam configuration using laser cooling and deflection techniques. This feature greatly reduces the effects of light shifts in the clock interaction region. These and other advantages will become more apparent from the following detailed description of the preferred embodiment.

DETAILED DESCRIPTION OF THE PREFERRED EMBODIMENT

Figure 1:
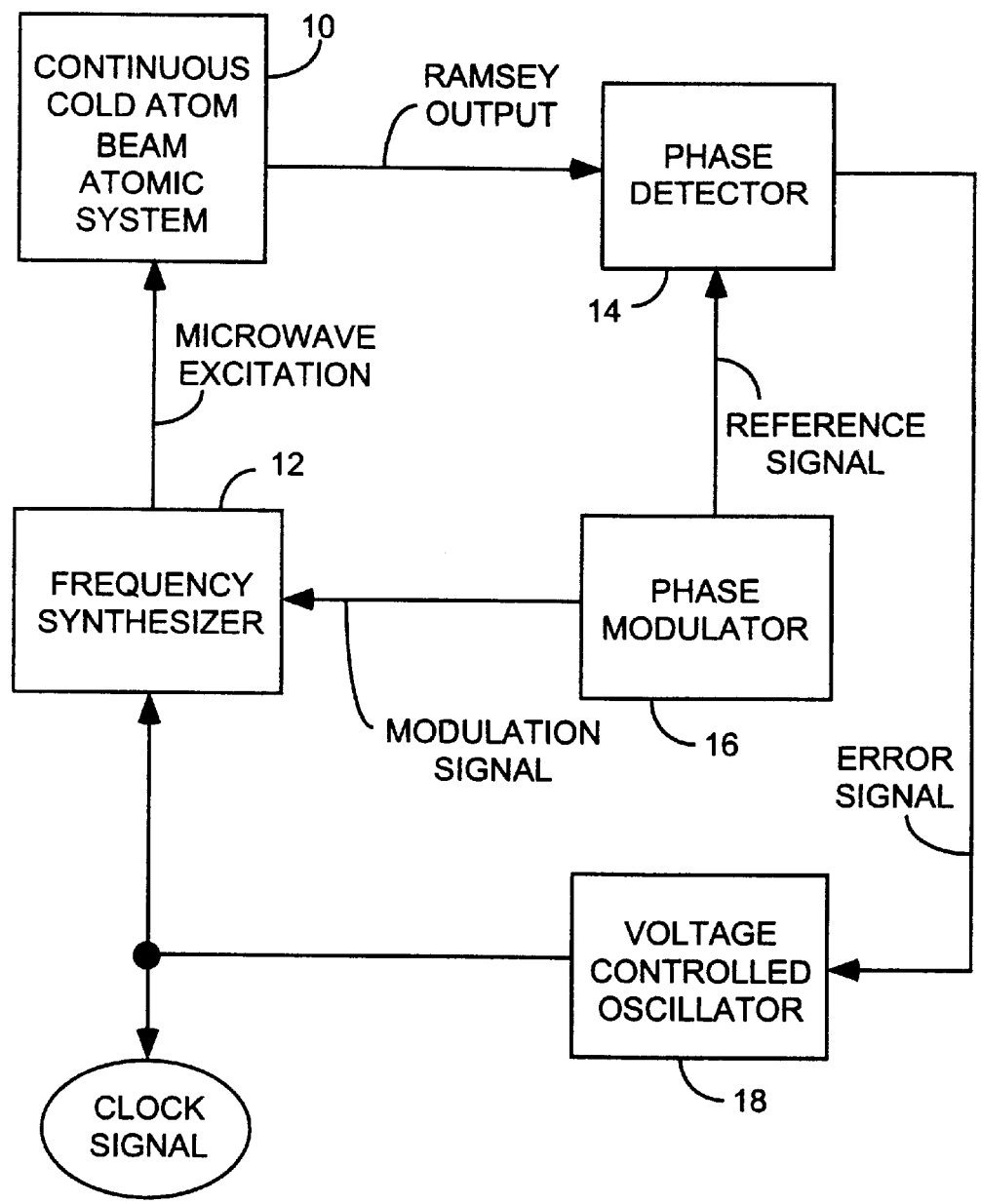
FIG. 1 is a block diagram of a cold atom atomic clock.

An embodiment of the invention is described with reference to the figures using reference designations as shown in the figures. Referring to FIG. 1, the continuous cold beam atomic clock is a conventional arrangement, the improvement being within the continuous cold atom beam atomic system 10. The continuous cold atom beam atomic system 10 receives a microwave excitation from a frequency synthesizer 12 for generating a Ramsey output is fed into a phase detector 14. The atomic clock provides a clock signal based on hyperfine quantum transitions of atoms within the atomic beam system 10. These transitions provide an internal reference for providing a Ramsey output when excited by the microwave excitation. The phase detector 14 receives a reference signal from the phase modulator 16. The phase modulator 6 provides a reference signal to the phase detector 14 and also provides a modulation signal to the frequency synthesizer for dithering the microwave excitation. The modulation signal dithers the microwave excitation about a center frequency providing a corresponding dithering of the Ramsey output. Ramsey output in fed into the phase detector 14 for providing an error signal to a voltage controlled oscillator (VCO) 18 providing the clock signal that is fed into a frequency synthesizer 12 then providing microwave excitation to the atomic system under closed loop control. The error signal controls the voltage controlled oscillator 18 providing the clock signal to frequency synthesizer 12 that upconverts and dithers the clock signal into the microwave excitation as modulated by the dithering modulation signal. The operational frequency of the atomic clock is the atomic resonant frequency at the atomic transition, and for the preferred cesium vapor atoms, the resonant frequency is approximately 9.2 GHz, for the transition between the $|F=3,M=0>$ to $|F=4,M=0>$ hyperfine ground states. The clock frequency of the atomic clock is at the VCO clock signal, e.g. 10 MHz, that is upconverted in the frequency synthesizer 12 to the resonant frequency of approximately 9.2 GHz that is dithered by the modulation signal as a dithering microwave excitation signal. The dithering of the microwave excitation exciting the atomic system 10 provides the Ramsey output having a dithering phase that is then detected by the phase detector 14 for providing the error signal. This phase dithering is centered about a resonant frequency and is compared to the reference signal for providing the error signal. The operation of this atomic clock is of conventional design, as is well known, except for the improvement of the continuous cold atom beam atomic system 10, providing improved frequency stability of the atomic clock.

Figure 2:
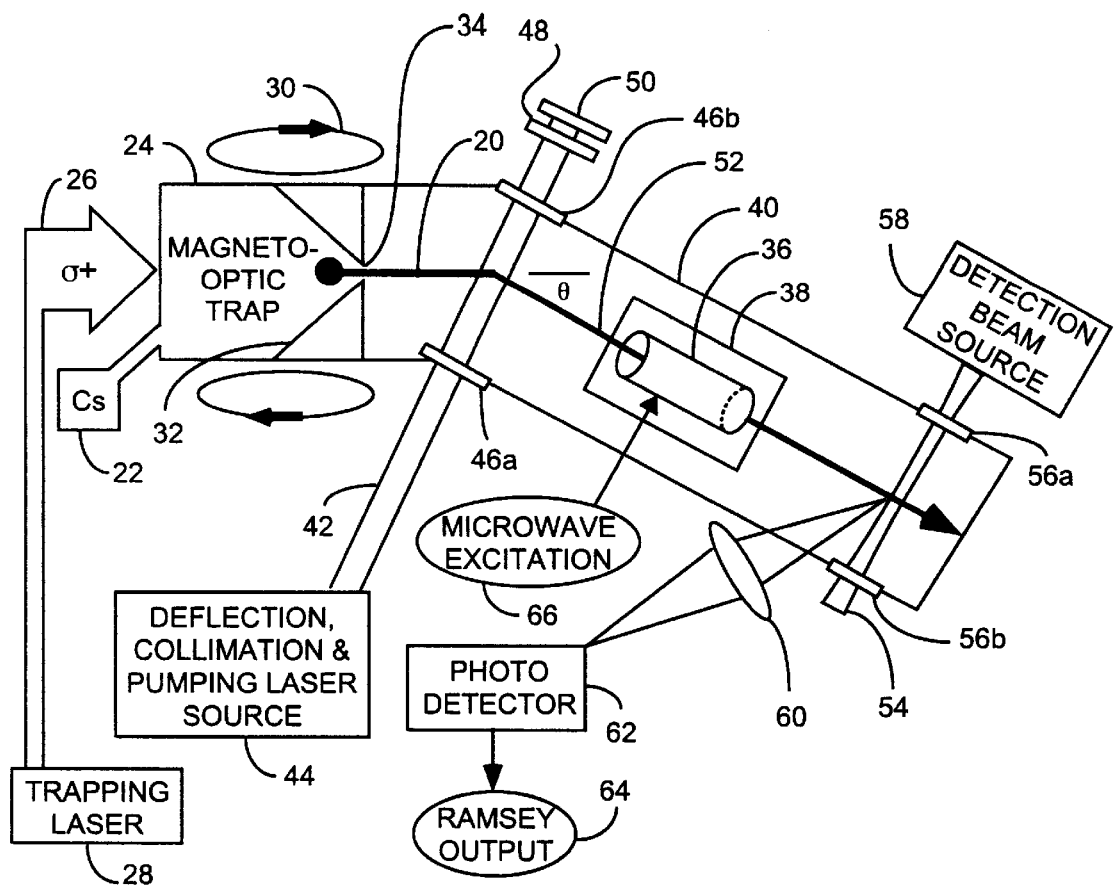
FIG. 2 is a diagram of a microwave cavity cold atom atomic clock system.

Referring to FIG. 2, a cold atom beam 20 is made of cesim atoms generated from a Cs vapor source 22 injecting Cs atoms into an improved magneto-optic trap (MOT) chamber. The Cs vapor is loaded into the MOT 24 forming a spatial center region wherein the Cs atoms are trapped. The Cs atoms are trapped by a combination of the trapping laser beam 26 from a trapping laser 28, and a magnetic field generated by anti-Helmholtz coils 30. The trapping laser 28 provides a single circularly polarized laser beam. The trapping laser 28 is locked to a frequency near the atomic resonance using offset saturation spectroscopy locking as is conventional practice. The trapping laser may be a 150 mW DBR diode laser SDL-5722. The trapping laser beam 26 is directed into a right angle conical reflector 32 through the MOT 24. Hence, the MOT 24 is formed by the trapping laser beam 26 directed into the MOT 24 in combination with the magnetic field from the coils 30. The trapping laser beam 26 provides counter-propagating light reflected towards the center region within the MOT 24 as reflected by the conical reflector 22. The laser beam has a frequency corresponding the $6S_{1/2}$ to $6P_{3/2}$ Cs atomic transition. The $6S_{1/2}$ level includes the ground state transition levels for determining the atomic clock signal. The conical reflector 22 provides three-dimensional counter-propagating light within the MOT 24 for creating the trap. Polarization changes upon reflection and the linear gradient magnetic field that flips the sign of the magnetic field at the center spatial region within the MOT 24 to trap the Cs atoms. The conical reflector 22 provides, in all three directions, counter-propagating equal intensity light all impinging on the spatial center region defining the trap location where the magnetic field equals zero, excepting for a small dark column coincident with the trapping laser beam 26 that is aligned with an apex aperture 34 of the conical reflector 32 for creating the dark column.

The trapping laser beam includes a central laser beam portion aligned with the apex aperture for creating a dark column of low velocity cold Cs atoms, as well as the reflected counter-propagating light portion. The trapping laser beam contains two frequencies. The first frequency is the trapping frequency between the $6S_{1/2} |F=4>$ level and the $6P_{3/2} |F=5>$ level. The second frequency is a repumping frequency between the $6S_{1/2} |F=3>$ level and the $6P_{3/2} |F=4>$ level. The trapping frequency serves to confine the Cs atoms in the MOT 24 and to eject the Cs atoms along the dark column and out of the MOT 24 through the apex aperture 34. The repump frequency serves to return the Cs atoms to the MOT 24 that have been optically pumped from the ground state $|F=4>$ level to the $|F=3>$ ground state level.

The conical reflector 32 may be a 2.5 cm radius OFHC-copper cylinder with a diamond-machined conical inner surface with a protected gold reflective coating of rms surface roughness less than 5 nm. The apex aperture 34 of the conical reflector 32, should be small, for example, 1 mm in diameter, to create a small diameter dark column. With this apex aperture 34, there is no reflected counter-propagating light along the dark column within the MOT 24 so that the central light portion of the trapping laser beam 26 will push the Cs atoms along the dark column and out through the apex aperture 34. The central portion of the trapping laser beam 26 is a central laser beam portion extending from the trapping laser 28, along the dark column between the center trap region and apex aperture 34. Hence, this apex aperture 34 is used to create the dark column with no retroreflected light, and the Cs atoms are forced out of the MOT 24 along this dark column by the central beam portion from the trapping laser 26 to then form a low velocity intense source (LVIS) of atoms as a continuous cold atom beam 20. The Cs atoms are thus collected in the MOT chamber 24, forced to the trap location by the magnetic field and counter-propagating light from the conical reflector 32, and then forced out by the central portion of the trapping laser beam 26 along the dark column and out through the apex aperture 34. Hence, the trapping laser beam 26 functions to cool the Cs atoms from an operating temperature, for example, room temperature, to about one milli-Kevin. By slowing the velocity of the atoms within the MOT 24 using counter-propagating laser light and magnetic fields, the Cs atom are cooled. The MOT 24 and improved conical reflector 32 with the apex aperture 34 provide the continuous cold atom atomic beam 20 that is not provided in discrete pulses. Additionally, the continuous cold atom beam 20 can be generated using a single trapping laser beam 26. The effective MOT capture radius, corrected for the conical geometry is about 1.5 cm, and the capture velocity is about 20 m/s. At an operating temperature of 320K, an atomic flux of about 3X10E10 atoms/s with an average longitudinal velocity of 10 m/s and a velocity spread of 2 m/s may be achieved. This improved LVIS, including the beam 26, MOT 24, coils 30, reflector 32, and aperture 34, provide a continuous cold atom beam 20 with MOT loss dominated by transfer of atoms from the MOT 24 to the atomic beam 20. Increasing the operating temperature may further increase atomic flux significantly for improved clock stability.

The central portion of the incident trapping laser beam 26 and the cold atom beam 20 are coincident and extending along the dark column and out of the MOT 24. The Cs atoms are accelerated out of the trap 24 by the central portion of the incident trapping laser beam 26, extending along the dark column, up to an atomic velocity, for example, between 2 m/s and 15 m/s having a velocity spread of about ten to twenty percent. The cold atom beam 20, when exiting the MOT 24, experiences transverse spreading that degrades clock performance by virtue of fewer atoms reaching a microwave cavity 36 surrounded by mu-Metal 38 in a vacuum chamber 40. To increase the atomic beam intensity within the chamber 40, a transverse laser cooling region immediately follows the apex aperture 34 of conical reflector 32. To reduce transverse spreading, the cold atom beam then interact with a pumping laser beam 42 from a deflection and collimation pumping laser source 44. The pumping laser beam 42 propagates through windows 46a and 46b into vacuum chamber 40. The pumping beam 42 passes through the cold atom beam 20 and chamber windows 46ab to illuminate a quarter-wave plate 48 and a retromirror 50 reflecting the pumping laser beam 42 counter-propagating back through the cold atom beam 20 with orthogonal polarization. The pumping laser beam 42 functions for transverse laser cooling of the cold atomic beam 20. The pumping laser beam 42 is tilted slightly at an angle 90 degrees minus Θ, for example, between 85 and 89 degrees with respect to the dark column of the cold atom beam 20, resulting in a bent deflected continuous cold atom beam 52. The trapping incident laser beam portion also exits the apex aperture 24 coincident with the cold atom beam 20, but the central laser beam portion is separated from the cold atom beam 20 by the angle Θ. The pumping beam 42 thus bends the cold atom beam 20 by transverse cooling. The pumping laser beam 42 thus functions to separate the atomic beam 20 from the coincident trapping laser beam portion that would cause unacceptably large light shifts in the microwave cavity 36. The pumping laser beam 42 also functions to place the Cs atoms in the cold atom beam 20 into the |F=3> or |F=4> ground states, as is well known in Ramsey-type atomic clocks, prior to excitation in the microwave cavity 36. The microwave excitation drives the Cs atoms to change from the |F=3> state to and from |F=4> state. A detection beam 54 passing through windows 56a and 56b from a detection beam source 58 and illuminates the deflected atomic beam 52 after passing through the microwave cavity 36. The illuminated deflected atomic beam 52 provides an illumination output focused through a lens 60 onto and detected by a photodetector 62 that then provides the Ramsey output 64. As the microwave excitation frequency varies, the amount of fluorescence caused by the illumination of the Cs atomic beam varies under closed loop control. The low velocity deflected cold atom atomic beam 52 provides more atoms within the Ramsey's interaction region of the microwave cavity 36 for improved signal strength. With a Ramsey interaction length of 15 cm and shot noise-limited fluorescence, detection of the atomic flux with laser optical pumping provides an estimated clock stability on the order of $[3X10E-14]/[\sqrt{T}]$.

Figure 3:
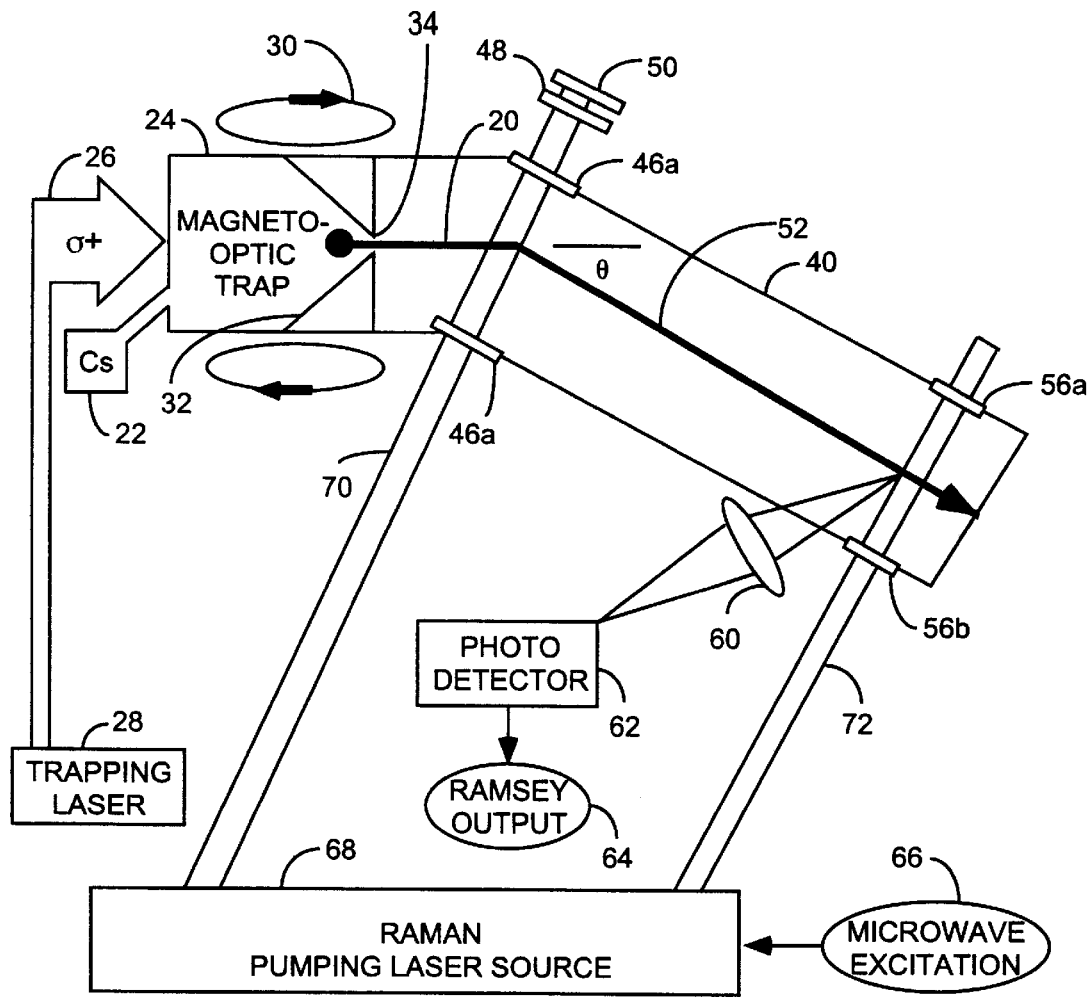
FIG. 3 is a diagram of a Raman cold atom atomic clock system.

In FIG. 3, a Raman atomic clock can also be improved using the continuous bent cold atom beam 52 generated from the beam 26, MOT 24, coils 30, reflector 32, apex 34. In the Raman atomic beam clock system, a Raman pumping laser 68 is used to generate two laser beams, a first Ramsey beam 70 and a second laser beam 72. The Raman laser beams 70 and 72 are modulated laser beams and are in coherent phase relationship to each other. The first Ramsey beam 70 is a pumping laser beam that functions to place the Cs atoms of the cold atom beam 20 into the |F=3> and |F=4> ground states in coherent superposition, as is well known in Ramsey type atomic clocks, prior to illumination in the vacuum chamber 40. The pumping laser is also used to deflect the continuous cold atom beam 20 into the bent deflected continuous cold atom beam 52, using the windows 46a and 46b, quarter-wave plate 48 and retromirror 50. The deflected continuous cold atomic beam 20 may have short term stability of $[3X10E-13]/[\sqrt{T}]$ at a comparable signal-to-noise ratio. The Raman system uses the second Ramsey beam 72 to illuminate the bent cold atom beam 52 and uses lens 60 and photodetector 62 to provide the Ramsey output. The Raman system may also include laser optical pumping not shown, to increase the initial population in the |M=0> state; the use of narrow linewidth DBR lasers improves the signal-to-noise ratio, with an estimated stability of $[3X10E-14]/[\sqrt{T}]$ to be achievable in a 40 cm long package with the size of the Cs beam atomic clocks as used on GPS satellites.

The present invention is characterized as a continuous cold atom beam means using a conical reflector and an apex aperture illuminated by a single trapping laser beam. The continuous cold atom beam is well suited for application in an atomic clock providing improved frequency stability. Those skilled in the art can make enhancements, improvements and modifications to enhance the invention. However, those enhancements, improvements and modifications may nonetheless fall within the spirit and scope of the following claims.

What is claimed is:

1. An atomic system for generating a continuous beam of cold atoms from a vapor of atoms, the atomic system comprising, a conical reflector for defining a cavity and for creating a magneto-optic trap within the cavity into which the vapor of atoms is received, the conical reflector having an apex aperture for ejecting the atoms out of the cavity as the continuous beam of cold atoms, a trapping laser providing a trapping laser beam illuminating the conical reflector, the trapping laser is aligned with the apex aperture for creating a dark column within the cavity, the conical reflector reflects the trapping laser beam in three dimensions creating three-dimensional counter-propagating light at the magneto-optic trap within the cavity except along the dark column extending along a central portion of the trapping laser light propagating through the magneto-optic trap along the dark column towards and through the apex aperture, and a magnetic field generator for providing a trapping magnetic field within the cavity, the trapping magnetic field has a strength gradient within the cavity, the trapping magnetic field decreases in strength, reaches zero, and changes sign at the magnetic-optic trap, the three-dimensional counter-propagating light and the trapping magnetic field function to force the atoms within the cavity towards the magneto-optic trap and to cool the atoms while the central portion of the trapping laser light pushes the atoms along the dark column extending from the magnetic-optic trap, through the apex aperture and out of the apex aperture as the continuous cold atom beam.

2. The atomic system of claim 1 wherein, the magnetic field generator comprises opposing anti-Helmholtz coils.

3. The atomic system of claim 1 wherein, the atoms are cesium atoms.

4. The atomic system of claim 1 wherein, the conical reflector is a 2.5 cm radius OFHC-copper cylinder with a diamond-machined conical inner surface and a gold reflective coating of rms surface roughness less than 5 nm, the gold reflective coating is protected by a dielectric protective overcoat.

5. The atomic system of claim 1 wherein, the trapping laser is a 150 mW DBR diode laser SDL-5722 locked to a frequency near an atomic resonance of the atoms using offset saturation spectroscopy locking.

6. An atomic system for generating a continuous beam of cold atoms from a vapor of atoms, the atomic system comprising,
   a conical reflector for defining a cavity and for creating a magneto-optic trap within the cavity into which the vapor of atoms is received, the conical reflector having an apex aperture for ejecting the atoms out of the cavity as the continuous beam of cold atoms,
   a trapping laser providing a trapping laser beam illuminating the conical reflector, the trapping laser is aligned with the apex aperture for creating a dark column within the cavity, the conical reflector reflects the trapping laser beam in three dimensions creating three-dimensional counter-propagating light at the magneto-optic trap within the cavity except along the dark column extending along a central portion of the trapping laser light propagating through the magneto-optic trap along the dark column towards and through the apex aperture,
   a magnetic field generator for providing a trapping magnetic field within the cavity, the trapping magnetic field has a strength gradient within the cavity, the trapping magnetic field decreases in strength, reaches zero, and changes sign at the magnetic-optic trap, the three-dimensional counter-propagating light and the trapping magnetic field function to force the atoms within the cavity towards the magneto-optic trap and to cool the atoms while the central portion of the trapping laser light pushes the atoms along the dark column extending from the magnetic-optic trap, through the apex aperture and out of the apex aperture as the continuous cold atom beam, the atomic system separating the continuous cold atom beam from the central portion of the trapping laser beam,
   a vacuum chamber for receiving the continuous cold atom beam,
   a retromirror,
   a quarter-wave plate aligned to the retromirror, and
   a pumping laser aligned with quarter-wave plate and retromirror for providing a pumping laser beam, the retromirror and the quarter-wave plate and the pumping laser beam are tilted from a direction orthogonal to the continuous cold atom beam and central portion of the trapping laser beam, the pumping laser beam passes through the quarter-wave plate and is reflected by the retromirror for providing counter-propagating illumination of the continuous cold atom beam to deflect by an angle Θ the continuous cold atom beam from the direction of the central portion of the trapping laser beam to separate the continuous cold atom beam from the central portion of the trapping laser beam as a deflected continuous cold atom beam.

7. The atomic system of claim 6, wherein the atomic system is also for receiving a microwave excitation and providing a Ramsey output, and wherein the pumping laser beam optically pumps the atom of the deflected continuous cold atom beam into a hyperfine ground state, the atomic system further comprising,
   a microwave cavity within the vacuum chamber for receiving deflected continuous cold atom beam excited by the microwave excitation for providing an excited cold atom beam,
   a detection beam source for illuminating the excited cold atom beam for providing a fluorescence output, and
   a photodetector for detecting the fluorescence output and providing the Ramsey output.

8. The atomic system of claim 7 is a component of an atomic clock, the atomic clock further comprising,
   a phase modulator for providing a reference signal and a modulation signal,
   a phase detector for receiving the Ramsey output and the reference signal for providing an error signal,
   a voltage controlled oscillator for receiving the error signal and for providing an atomic clock signal, and
   a frequency synthesizer for receiving the atomic clock signal and the modulation signal and for generating the microwave excitation signal.

9. An atomic system for generating a continuous beam of cold atoms from a vapor of atoms, the atomic system comprising,
   a conical reflector for defining a cavity and for creating a magneto-optic trap within the cavity into which the vapor of atoms is received, the conical reflector having an apex aperture for ejecting the atoms out of the cavity as the continuous beam of cold atoms,
   a trapping laser providing a trapping laser beam illuminating the conical reflector, the trapping laser is aligned with the apex aperture for creating a dark column within the cavity, the conical reflector reflects the trapping laser beam in three dimensions creating three-dimensional counter-propagating light at the magneto-optic trap within the cavity except along the dark column extending along a central portion of the trapping laser light propagating through the magneto-optic trap along the dark column towards and through the apex aperture, the atomic system separating the continuous cold atom beam from the central portion of the trapping laser beam,
   a magnetic field generator for providing a trapping magnetic field within the cavity, the trapping magnetic field has a strength gradient within the cavity, the trapping magnetic field decreases in strength, reaches zero, and changes sign at the magnetic-optic trap, the three-dimensional counter-propagating light and the trapping magnetic field function to force the atoms within the cavity towards the magneto-optic trap and to cool the atoms while the central portion of the trapping laser light pushes the atoms along the dark column extending from the magnetic-optic trap, through the apex aperture and out of the apex aperture as the continuous cold atom beam,
   a vacuum chamber for receiving the continuous cold atom beam,
   a retromirror, a quarter-wave plate aligned to the retromirror, and a pumping laser aligned with quarter-wave plate and retromirror for providing a pumping laser beam, the retromirror and the quarter-wave plate and the pumping laser beam are tilted from a direction orthogonal to the continuous cold atom beam and central portion of the trapping laser beam, the pumping laser beam passes through the quarter-wave plate and is reflected by the retromirror for providing counter-propagating illumination of the continuous cold atom beam to deflect by an angle $\Theta$ the continuous cold atom beam from the direction of the central portion of the trapping laser beam to separate the continuous cold atom beam from the central portion of the trapping laser beam as a deflected continuous cold atom beam, the atomic system Raman pumping of the deflected continuous cold atom beam, the atomic system receiving a microwave excitation and is for providing a Ramsey output, the pumping laser Raman pumping laser receiving the microwave excitation and providing a first Ramsey laser beam and a second Ramsey laser beam, the pumping laser beam is the first Ramsey laser beam, the first Ramsey laser beam deflecting the continuous cold atom beam to form the deflected cold atom beam and for placing the atoms of the deflected continuous cold atom beam into a coherent superposition state, and, the second Ramsey laser beam illuminating the deflected continuous cold atom beam in the coherent superposition state within the vacuum chamber for providing a fluorescence output for generating the Ramsey output.

10. The atomic system of claim 9 is a component of an atomic clock, the atomic clock further comprising, a phase modulator for providing a reference signal and a modulation signal, a phase detector for receiving the Ramsey output and the reference signal for providing an error signal, a voltage controlled oscillator for receiving the error signal and for providing an atomic clock signal, and a frequency synthesizer for receiving the atomic clock signal and the modulation signal and for generating the microwave excitation signal.

* * * * *